United States Patent [19]

Blair, Jr.

[11] 4,091,439

[45] May 23, 1978

[54] HIGH VOLTAGE POWER SUPPLY WITH INTERNAL COUNTERBALANCING MECHANISM

[75] Inventor: William C. Blair, Jr., Yonkers, N.Y.

[73] Assignee: Del Electronics Corporation, Mount Vernon, N.Y.

[21] Appl. No.: 786,600

[22] Filed: Apr. 11, 1977

[51] Int. Cl.² .............................................. H02B 1/18

[52] U.S. Cl. .................................. 361/334; 361/385; 49/445

[58] Field of Search ............... 49/445, 446; 174/52 R; 361/331, 332, 334, 335, 380, 385

[56] References Cited

U.S. PATENT DOCUMENTS

| | | | |
|---|---|---|---|
| 2,346,460 | 4/1944 | Sillers | 361/335 |
| 3,600,636 | 8/1971 | Petersen | 361/385 |
| 3,991,264 | 11/1976 | Connell | 361/334 |

*Primary Examiner*—Gerald P. Tolin
*Attorney, Agent, or Firm*—James & Franklin

[57] ABSTRACT

The power supply includes a transformer situated in an enclosure having a movable cover. The transformer is immersed in oil and the electronic components associated therewith are affixed to a support connected to and movable with the cover. To eliminate the necessity for an independent external cover lifting mechanism, normally required to move the cover to permit access to the interior of the enclosure because of the weight thereof, a counterbalancing mechanism, situated wholly within the enclosure, is provided to facilitate servicing of the electronic components. The mechanism includes a pair of planar counterbalancing members, each of which is mounted for movement along a different interior wall of the enclosure. Each member is connected by cables to the cover, the cables cooperating with sheaves, rotatively mounted to the enclosure wall. The counterbalancing mechanism requires no additional space within the enclosure and is comprised of simple, inexpensive and reliably operating parts.

19 Claims, 3 Drawing Figures

FIG. 1
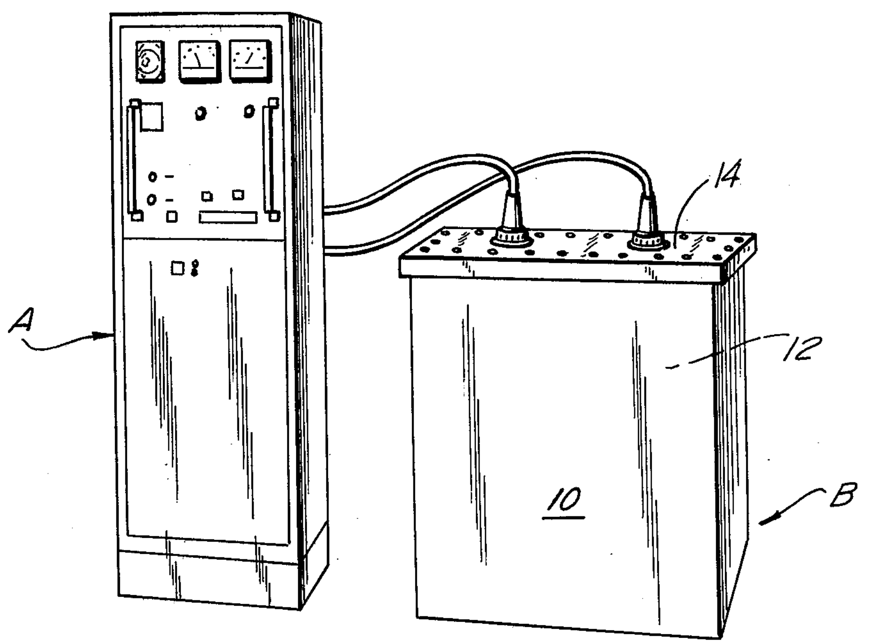
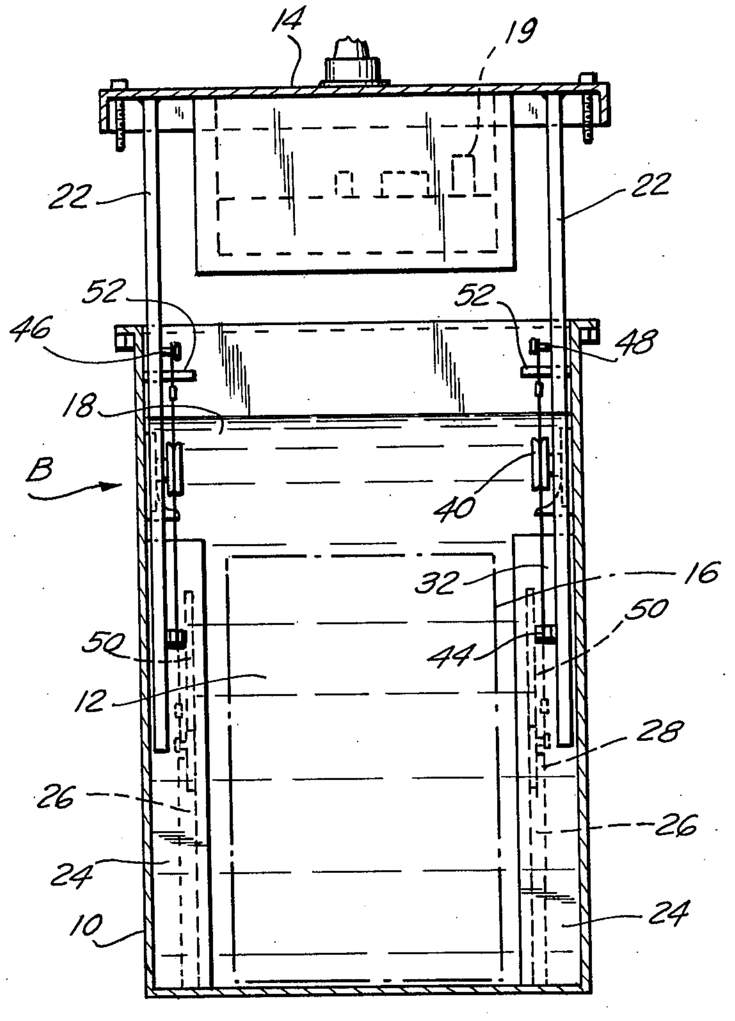
FIG. 3

HIGH VOLTAGE POWER SUPPLY WITH INTERNAL COUNTERBALANCING MECHANISM

BACKGROUND OF THE INVENTION

The present invention relates to high voltage power supplies and in particular to an internally situated counterbalancing mechanism designed to facilitate access to the electrical components of the transformer enclosure.

High voltage power supplies are utilized in a number of medical applications, such as for computerized axial tomography x-ray techniques. The supplies are utilized to automatically and accurately control the x-ray tube voltage and emission in order to provide optimum tomographic quality.

Conventional voltage supplies of this type normally consist of two separate units. One unit is provided to control the output of the supply. The anode current and voltage to the x-ray tube are thus regulated and monitored, either by the x-ray operator or through computer programming. The second unit consists of a covered enclosure or tank which contains an oil immersed transformer and the electronic components associated therewith. The units are interconnected by means of wire leads.

Voltage supplies of this type are capable of generating an accurately regulated output on the order of 150 KV at 50 mils. In order to produce this magnitude of output, a large transformer mounted to a frame assembly within the enclosure is required. The frame and transformer weigh approximately 1200 lbs. The weight of the overall transformer enclosure, including oil, cover and electronics, is in the neighborhood of 2000 lbs. Thus, what is involved is a massive, bulky piece of apparatus, difficult to ship and especially with respect to the electronics within the transformer enclosure, difficult to service because this portion of the supply is not readily accessible.

In order to facilitate servicing of the electronic components situated within the transformer enclosure, these components may be mounted on a frame or support connected to the interior surface of the movable cover. However, the enclosure and particularly the cover therefor, must be quite sturdy in nature and the weight of this cover in conjunction with the weight of the electronic components mounted thereto is quite substantial. In fact, the enclosure cover and electronics weigh approximately 300 lbs. to 400 lbs. and thus an independent, external lifting mechanism, such as a small crane, is required to move the cover to provide access to the interior of enclosure. To facilitate movement of the cover, the exterior surface of the cover may be provided with rings or the like in order to permit attachment of the crane thereto. Because of the requirement of an external lifting mechanism, servicing of the electronic components within the transformer enclosure is an expensive and time consuming project.

It is, therefore, a prime object of the present invention to provide a high voltage power supply which incorporates, within the transformer enclosure, a counterbalancing mechanism to facilitate access to the electronic components therein and eliminate the necessity for independent external lifting apparatus.

It is another object of the present invention to provide a high voltage power supply with an internal counterbalancing mechanism which provides for balanced forces on the enclosure cover to prevent skewing thereof during movement.

It is a further object of the present invention to provide a high voltage power supply with an internal counterbalancing mechanism which requires no additional space within the enclosure for the operation thereof.

It is a further object of the present invention to provide a high voltage power supply with an internal counterbalancing mechanism wherein the mechanism is comprised of simple, inexpensive components which function reliably.

In accordance with the present invention, a high voltage power supply unit includes a transformer and the electronic components associated with the transformer. An oil containing enclosure is provided in which the transformer is situated. The enclosure has a cover movable between the first position, where the enclosure is closed and the second position, wherein the interior of the enclosure is accessible. A support, to which the electronic components are mounted, is connected to the cover and movable therewith. Means, situated within the enclosure and operably connected to the cover, are provided to facilitate movement of the cover between the first and second positions.

The movement facilitating means comprises a pair of planar counterbalancing members, each of which is movably mounted along a different one of the interior walls of the enclosure. Each of the counterbalancing members is operably connected to the enclosure cover by a pair of cables which cooperate with sheaves rotatably mounted to the enclosure wall. Means are also provided for retaining each of the counterbalancing members in a fixed position with respect to the wall adjacent thereto in order to prevent movement of the members during shipment of the enclosure.

The power supply set forth herein is disclosed as being utilizable in x-ray tomography. This function is described for illustrative purposes only and the present invention should not be construed as being limited to this particular application.

To these and other objects as may hereinafter appear, the present invention relates to a high voltage power supply with an internal counterbalancing mechanism, as described in the specification and set forth in the annexed claims taken together with the accompanying drawings wherein like numerals refer to like parts and in which:

FIG. 1 is an isometric view of the exteriors of the control and transformer enclosure units of the present invention;

FIG. 3 is a transverse cross-sectional view of the transformer enclosure of the present invention.

Figure 2:
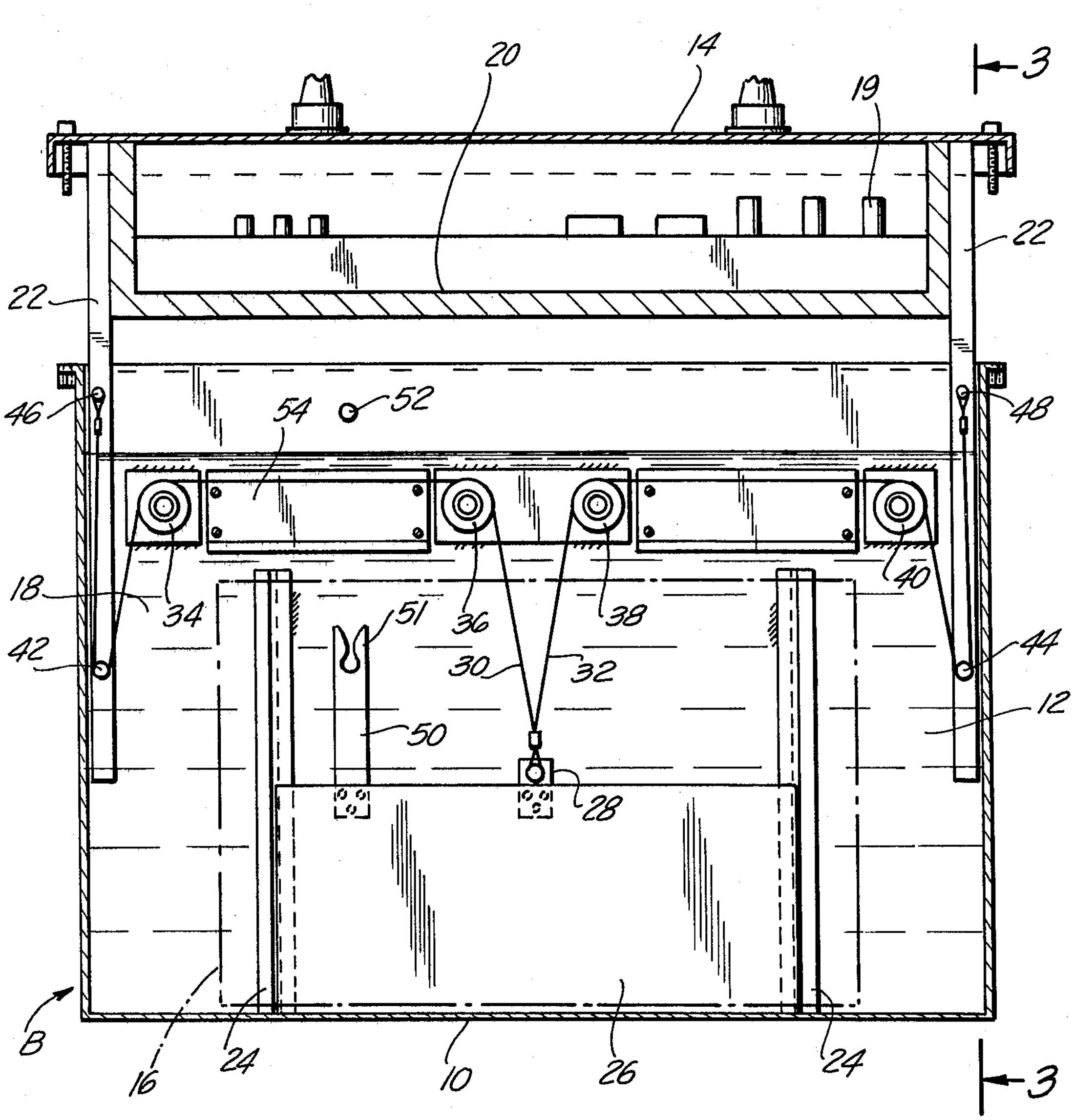
FIG. 2 is a longitudinal cross-sectional view of the transformer enclosure of the present invention.

As shown in FIG. 1, the high voltage power supply of the present invention includes two units, a control unit, generally designated A, and a transformer enclosure, generally designated B, which are interconnected by wire cables. The control unit A is provided with the necessary control and monitoring devices for the regulation of the anode current and voltage for an x-ray tube (not shown) to permit regulation thereof by an x-ray operator or through computer programming. Unit B houses the transformer and associated electronic components.

Unit B includes a box-like enclosure having a front wall 10, a rear wall 12 and a movable cover 14. The peripheral edge of cover 14 is provided with a downwardly protruding lip to overlap the peripheral flange of the enclosure. A series of bolts are provided to attach the lip to the flange to secure cover 14 to the remainder of the enclosure.

As best seen from FIGS. 2 and 3, the transformer 16 is situated within the enclosure B (on a frame, not shown) and is immersed in oil 18 contained therein in order to electrically isolate same. The electrical components 19 associated with the transformer are mounted on a support 20 which is attached to the interior surface of cover 14. Also affixed to the underside of cover 14 are four downwardly extending elongated members 22 each of which is situated adjacent a different one of the corners of cover 14. Members 22 extend along the corners of the enclosure walls 10 and 12 and act as a guide for the vertical movement of the cover. A separate internal counterbalancing mechanism is provided adjacent to the interior of each of the enclosure walls 10 and 12 in order to provide a balanced lifting force on both sides of cover 14 to prevent skewing of the cover during movement thereof. Since each of the counterbalancing mechanisms is structurally identical, only one is described in detail, it being understood that the mechanism located adjacent the opposing wall is virtually the same.

Welded to the interior of wall 12 are a pair of guide members 24 each having a "Z"-shaped cross section. Members 24 form a pair of oppositely oriented channels into which the edges of counterbalancing member 26 extend. Counterbalancing member 26 has a planar configuration and is movable in a vertical direction along the interior of a wall 12 within the channels formed by guide members 24.

Located on the top portion of member 26 is a yoke 28 to which the ends of a pair of cables 30, 32 are affixed. Four ball-bearing sheaves 34, 36, 38 and 40 are rotatably mounted to the interior of wall 12 along a horizontal line situated above guide members 24. Cable 30 cooperates with sheaves 34 and 36. In a similar manner, cable 32 cooperated with sheaves 38 and 40. Each of the elongated members 22 is provided with a thimble 42, 44 near the lower extremity thereof. An intermediate portion of cable 30 passes underneath thimble 42 and the end thereof is connected to a fixed point 46 on the interior surface of elongated member 22 near the top thereof. Likewise, an intermediate portion of cable 32 passes around thimble 44 and the end thereof is affixed to a fixed point 48 near the top of the elongated member 22. In this manner, the downward force exerted by gravity on counterbalancing member 26 is transmitted and redirected in an upward direction, by means of cables 30, 32 to elongated members 22 and thus cover 14 connected thereto. The weight of counterbalancing member 26 is calculated such that the forces exerted in the upward vertical direction on cover 14 are approximately equal to the weight of the cover and the electronic components mounted thereon. Of course, the buoyancy of the counterbalancing member 26 in the oil bath must be taken into consideration in this calculation to provide the necessary counterbalancing force.

Cover 14 is movable from a closed position, as shown in FIG. 1, to a position wherein access to the interior of enclosure B is possible, as shown in FIGS. 2 and 3. As can be readily appreciated, the counterbalancing mechanisms provided on each side of the enclosure greatly facilitate the movement of cover 14 between the illustrated positions. Thus, a service man, when access to the electronic components is necessary, can simply unscrew the bolts connecting cover 14 to the remainder of the enclosure and manually lift the cover to the position shwon in FIGS. 2 and 3. In this position, the electronic components are accessible for servicing.

Extending upwardly from the top of counterbalancing member 26 is a retaining bar 50 which is designed by means of a bifurcated portion 51, to engage and be clamped to a bold or stud 52, affixed to the interior of wall 12 near the top thereof, along the path of movement of retaining bar 50. Bar 50 and stud 52 are provided so that counterbalancing member 26 may be temporarily affixed to the interior of wall 12 to prevent movement thereof. In this manner, the counterbalancing member may be secured during shipment.

More specifically, prior to shipment, cover 14 is secured in place, as shown in FIG. 1, by connecting the flange screws. Then, bar 50 is secured to the wall 12 by means of bifurcated portion 51 and stud 52. Access to stud 52 is accomplished through a hand hold (not shown) in cover 14. Securing the counterbalance member to the tank wall prevents any additional horizontal component to the vertical members 22 during shipment.

It is also preferable to provide a retainer guide having a lip 54 thereon affixed to the interior wall 12 between sheaves 34 and 36. The purpose of the retainer guide with its protruding lip 54 is to prevent the bifurcated portion 51 of bar 50 from engaging the cross cable during the vertical movement of bar 50.

It should be appreciated that the entire counterbalancing mechanism is situated adjacent the interior wall of the enclosure between the wall and transformer in a portion of the space normally provided for clearance therebetween. Therefore, the counterbalancing mechanism requires no additional space within the enclosure.

Thus, the present invention relates to a high voltage power supply having an internal counterbalancing mechanism which facilitates access to the electronic components situated under the enclosure cover. The counterbalancing mechanism is situated wholly within the enclosure and requires no additional space therein. It provides balanced forces to each of the four corners of the movable cover to prevent skewing of the cover as same is moved. The counterbalancing mechanism comprises simple, inexpensive parts designed to function in a reliable manner.

While only a single preferred embodiment of the present invention has been described herein for purposes of illustration, it is obvious that many modifications and variations could be made thereto. It is intended to cover all these modifications and variations which fall within the scope of the present invention as defined by the following claims.

I claim:

1. A high voltage power supply comprising a transformer, electronic components associated with said transformer, an enclosure in which said transformer and said electronics are situated, an enclosure cover movable between a first position wherein the enclosure is closed and a second position wherein the interior of the enclosure is accessible, a support to which said electronic components are mounted, said support being connected to said cover and movable therewith, and means, situated within said enclosure and operably connected to said cover, to facilitate movement thereof between said first and second positions.

2. The supply of claim 1 wherein said movement facilitating means comprises a counterbalancing member and means for operably connecting said member to said cover.

3. The supply of claim 2 wherein said member has a planar configuration.

4. The supply of claim 2 further comprising guide means situated on the wall of said enclosure adjacent said member for forming a channel along which said member is movable.

5. The supply of claim 1 wherein said cover further comprises downwardly extending elongated members mounted to the interior surface of said cover.

6. The supply of claim 2 wherein said connecting means comprises a sheave rotatably mounted to said enclosure and a cable connected, at one point, to said member, at another point to said cover and at an intermediate portion between said points, to said cover, said cable being supported, at least at one point there along, by said sheave.

7. The supply of claim 1 wherein said movement facilitating means comprises a pair of counterbalancing members, each of which is situated adjacent a different wall of said enclosure.

8. The supply of claim 6 wherein said connecting means comprises a pair of cables and pair of rotatable sheaves associated with each of said cables.

9. The supply of claim 2 further comprising means for connecting said member to the enclosure wall to prevent movement of said member relative thereto.

10. The supply of claim 9 wherein said connecting means comprises a retaining member operably connected to said counterbalancing member and movable therewith, and a stud operably connected to said enclosure wall, said retaining member having means thereon for engaging said stud.

11. The supply of claim 10 wherein said engaging means comprises a bifurcated portion having two elements between which said stud is insertable.

12. The supply of claim 10 wherein said stud is situated along the path of movement of said retaining member.

13. The supply of claim 10 wherein said connecting means further comprises a member operably connected to the wall of said enclosure and extending outwardly therefrom in a direction towards the path of movement of said retaining member so as to engage and stabilize said retaining member when same is in position to engage said stud.

14. An enclosure for a transformer and the electronic components associated therewith of the type used in a high voltage power supply comprising a base portion in which the transformer is situated, a movable cover, a support to which the electronic components are mounted, said support being operably connected to said cover for movement therewith, a counterbalancing member centrally located adjacent the interior of one of the walls of the enclosure and vertically movable therealong and means operably connecting said counterbalancing member to said cover.

15. The enclosure of claim 14 wherein said connecting means comprises a cable, connected at one end thereof to said member and having a first portion thereof directed in a generally upward direction, a second portion thereof directed in a generally downward direction and a third portion thereof directed in a generally upward direction.

16. The enclosure of claim 15 further comprising a sheave rotatably mounted on the wall of said base portion, said cable passing over said sheave at a point thereon between said first and said second portion thereof.

17. The enclosure of claim 16 further comprising an elongated downwardly extending member connected to said cover and a thimble mounted thereon, said cable passing underneath said thimble at a point there along between said second and said third portion thereof.

18. The enclosure of claim 17 wherein the other end of said cable is connected to the enlongated extending member.

19. The enclosure of claim 15 wherein said connecting means comprises a second portion of said cable extending towards the other side of said base portion.

* * * * *